(12) United States Patent
Teliszczuk et al.

(10) Patent No.: US 7,578,310 B2
(45) Date of Patent: Aug. 25, 2009

(54) PRESSURE CONTROLLER DEVICE

(75) Inventors: Roman Teliszczuk, St-Francois Laval (CA); Francois Delaney, L'Assomption (CA)

(73) Assignee: Delaney Machinerie Inc., L'Assomption (QC) (CA)

( * ) Notice: Subject to any disclaimer, the term of this patent is extended or adjusted under 35 U.S.C. 154(b) by 275 days.

(21) Appl. No.: 11/431,702

(22) Filed: May 11, 2006

(65) Prior Publication Data
US 2007/0261739 A1 Nov. 15, 2007

(51) Int. Cl.
*F16K 31/145* (2006.01)
*G05D 16/16* (2006.01)

(52) U.S. Cl. ............... 137/489; 137/505.14; 251/29
(58) Field of Classification Search ............ 137/489, 137/505.14; 251/25, 29
See application file for complete search history.

(56) References Cited

U.S. PATENT DOCUMENTS

| | | | |
|---|---|---|---|
| 3,482,594 A * | 12/1969 | Erfried | 137/538 |
| 3,654,415 A | 4/1972 | Hawkins et al. | |
| 3,893,472 A | 7/1975 | Schuster | |
| 3,931,486 A | 1/1976 | Raetz | |
| 4,134,418 A | 1/1979 | Woodcock | |
| 4,243,273 A | 1/1981 | Wright | |
| 4,849,587 A | 7/1989 | Bacon | |
| 5,189,844 A | 3/1993 | Swarden et al. | |
| 5,555,910 A * | 9/1996 | Powell et al. | 137/488 |
| 6,439,262 B1 | 8/2002 | Hosono et al. | |
| 6,655,033 B2 | 12/2003 | Herrmann et al. | |
| 6,832,628 B2 * | 12/2004 | Thordarson et al. | 137/613 |

* cited by examiner

*Primary Examiner*—Stephen M Hepperle
*Assistant Examiner*—William McCalister
(74) *Attorney, Agent, or Firm*—Equinox Protection; Franz Bonsang, Patent Agent

(57) ABSTRACT

A pressure controller device includes a housing accommodating a precision pressure regulator incorporating a first diaphragm operable upon a main valve provided between an inlet and an outlet in the housing. The regulator further includes a second diaphragm operable upon a flapper-nozzle arrangement to set the pressure of the working fluid discharged through the device. The housing further includes a resiliently loaded shuttle actuable by an operating handle connected thereto and externally protruding from the housing to operate the second diaphragm and the flapper-nozzle arrangement. Manual operation of the handle, and resulting linear movement of the shuttle, effects movement of the second diaphragm and the flapper-nozzle arrangement and thus by pressure fluid to operate the first diaphragm and thus the main valve. Consequential variation in the pressure of the fluid delivered by the device is thus achieved by the shuttle overriding the operation of the diaphragms and thus the valve.

14 Claims, 5 Drawing Sheets

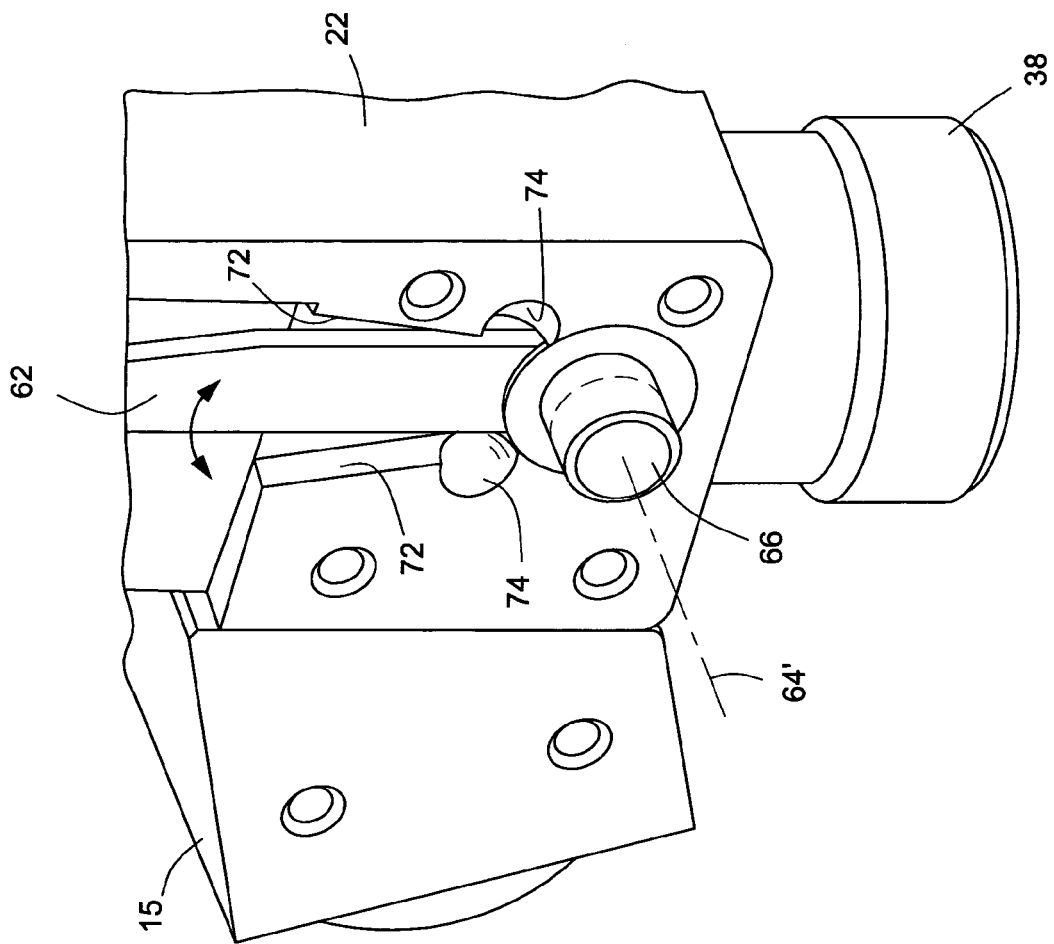

PRESSURE CONTROLLER DEVICE

FIELD OF THE INVENTION

The present invention relates to a pressure controller device, particularly but not exclusively for use in a system for lifting and moving an object.

BACKGROUND OF THE INVENTION

In our U.S. Pat. No. 6,845,872 there is described a system for lifting and moving an object that includes a vertical post having a transversal lifting arm rotatably connected thereto for rotation about a vertical axis thereof. The vertical post is in the form of a hollow cylinder and includes a weight acting as a piston within the cylinder, the weight being connected by a cable to a carriage slidably mounted on the lifting arm, such that down and up displacements of the weight by gravity or pressurized fluid respectively raise and lower the object accordingly. The control of the pressure fluid flow to the cylinder is manually effected and in this instance is achieved purely by the use of a simple on/off valve. When elevating and moving weights a high degree of accuracy is desirable, at the very least for the sake of safety and thus any jerking movement or rapid ascent or descent or general movement of the object is to be avoided.

Accordingly we devised a proportional valve as is disclosed in U.S. Pat. No. 6,988,513. This valve is intended to be mounted on the base of the post described in the patent mentioned supra suitably secured as by bolting thereto. Whilst this arrangement functions satisfactorily, there remains the need to vary and control the pressure of the working fluid being fed to the proportional valve, thereby to confer on the system a high degree of accuracy in terms of movement and positioning of the elevated load.

SUMMARY OF THE INVENTION

It is therefore a general object of the present invention to provide an improved pressure controller device.

An advantage of the present invention is that the pressure controller device simplifies actuation of the pressure control handle.

Another advantage of the present invention is that the pressure controller improves accuracy of the pressure fluid supply, as well as the promptness of the response.

A further advantage of the present invention is that the pressure controller automatically returns the pressure fluid supply to the initial set pressure upon release of the control handle.

Yet another advantage of the present invention is that the pressure controller allows the user to precisely adjust the set point pressure.

Still another advantage of the present invention is that the pressure controller is carried and operated with a single hand of the operator, thus leaving the other hand free.

According to the invention there is provided a pressure controller device for instantaneous operation with a finger of a user including a housing, a precision pressure regulator located in the housing, an inlet and an outlet for a working fluid in the housing, a valve located intermediate said inlet and outlet, a first diaphragm operable upon said valve and actuable by the working fluid, a pressure adjustment mechanism located in the housing and including a second diaphragm and a flapper-nozzle arrangement actuable by said second diaphragm, said device comprises a shuffle resiliently loaded at each end thereof and actuable to operate said second diaphragm, a handle located externally of the housing carried on at least one lever arm external to the housing, the arm supporting at a distal end remote therefrom a shaft rotatably mounted on the housing and providing a pivot axis for the handle, a central portion of the shaft connecting to the shuttle intermediate both ends thereof, the handle being and operable between predetermined limits to shift said shuffle and to move the second diaphragm and thus the flapper-nozzle arrangement thereby through the agency of the first diaphragm to adjust the pressure of the working fluid flowing through the valve between the inlet and the outlet, the operation of the handle in use overriding the precision pressure regulator to vary the pressure of the working fluid passing through the outlet.

The resilient loading of the shuffle is conveniently achieved by the use of open coil compression springs operating on each end of the shuffle which is enclosed within the housing. Advantageously the spring rate is adjustable by a suitable control located externally of the housing to adjust the controller device set point. The control may comprise a screw adjustment carried in an end cap.

Preferably two lever arms are provided and support at their distal ends remote from the handle a shaft extending through the housing and rotatably mounted therein vie appropriate bushing. A central portion of the shaft is suitably formed to embrace the shuffle and is provided with a pin in registration with a slot formed in the shuttle, the pin being in contact with an end of the slot. In use rotation of the shaft, caused by operation of the handle and pivoting of the lever arms, occasions movement of the pin to shift the shuffle linearly against the action of the resilient loading. The degree of travel of the lever arms is limited by suitable formations on the exterior of the housing. Further, recesses may be provided adjacent the formations for the purpose of being able in practice to clean the area to ensure ease of movement.

The second diaphragm is mechanically held in a neutral position by dint of the resilient loading.

In operation the second diaphragm is moved manually by an operative in response to perceived requirements to increase or decrease the pressure. In this respect, as an example, the neutral set point pressure as determined by the position of the end cap, or neutral set-point output pressure mechanism, may be of the order of 50 psi, and the range of variation achievable by the use of the handle and the movement of the second diaphragm may be in the region of from 20 psi to 80 psi, providing the input pressure is at least 80 psi.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein:

FIG. 1a is schematic perspective view of a hidden detail of the device shown in FIG. 1;

DETAILED DESCRIPTION OF THE PREFERRED EMBODIMENTS

Figure 1:
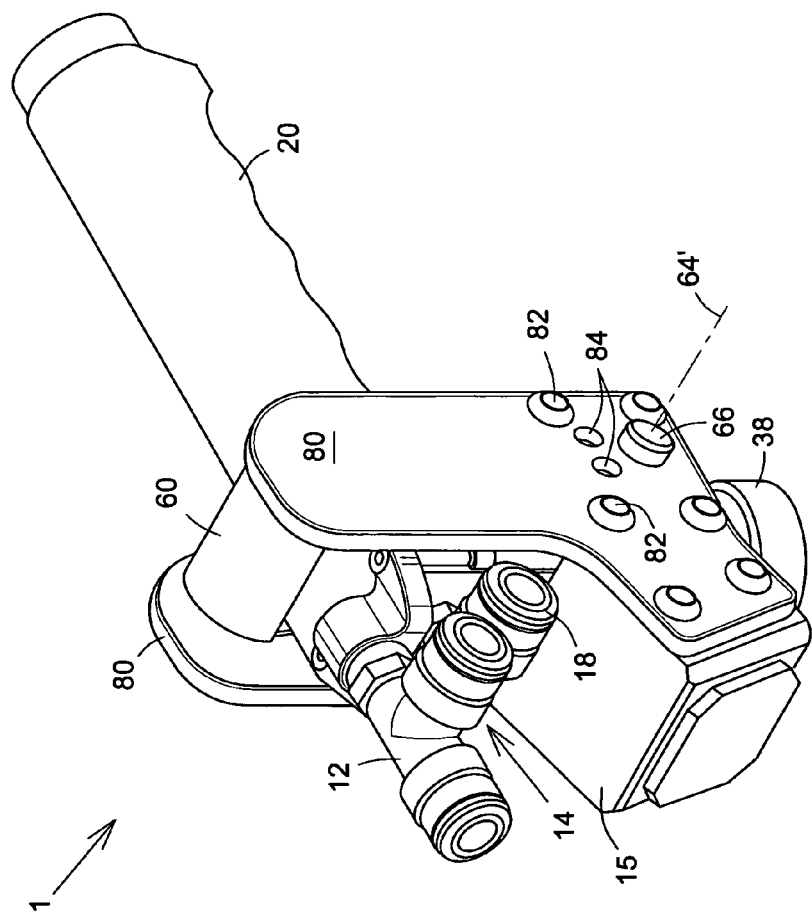
FIG. 1 is a partial schematic top perspective view of a pressure controller device in accordance with an embodiment of the present invention.

With reference to the annexed drawings the preferred embodiments of the present invention will be herein described for indicative purpose and by no means as of limitation.

Referring to FIGS. 1 through 4, there is illustrated a pressure controller device 1 comprising a housing 2 having a first part 4 enclosing a precision pressure regulator 6 or the like, and incorporating a first diaphragm 8. An inlet 10 for pressure fluid is provided in the part 4 with a feed pipe 12 for the supply of the fluid, and optionally a second inlet 14 may be teed into the feed pipe as shown. A connector piece 15, which could be of any other shape than the one shown in the figures, mounted on the housing 2 allows to secure any working equipment (not shown) or the like that might be useful to the operator to the controller 1. An outlet 16 is formed in the first part 4 and is provided with a swivel delivery pipe 18. A valve 17 is provided intermediate the inlet 10 and the outlet 16, the valve being actuable by the first diaphragm 8, itself fed by the inlet 10 via a fixed throttle side passage 19 (shown in dotted lines in FIG. 4). A grip 20 is mounted on the first part 4 of the housing 2 and has an internal passageway 21 leading to an exhaust at 23 for the leakage in use of air. The leakage in use is arranged to be continuous, since the bleeding of air from the bleeding conduit 25 of regulator 6 is, to provide a cleaning effect for the device.

The housing 2 has a second part 22 enclosing a second diaphragm 24 operable by means of a flapper-nozzle arrangement 26 connected thereto, the second diaphragm 24 being operable mechanically by means of a shuttle 30 to move the diaphragm 28 thereby to adjust the flapper-nozzle arrangement 26 and thus the pressure acting on the first diaphragm and the pressure at which the valve 17 operates.

The shuttle 30 is resiliently loaded, typically at both ends thereof by any type of conventional mechanism such as using permanent magnets (optionally electromagnets), any type of resilient polymer, rubber, pneumatic cylinders, coil springs or the like. Typically, the shuttle 30 is of general dumb-bell shape having a central spindle 31 with a shoulder 32 at each end abutted by an open-coil compression spring 34, 36, the spring 34 extending into an end cap 38 with a mount 40. The lower region of the second part 22 of the housing 2 is apertured at 42 for the receipt of an externally threaded sleeve 44 with which the end cap 38 engages.

In use screwing movement of the end cap 38 over the sleeve 44 varies the spring rate of the spring 34 and thus the load applied to the second diaphragm 24 and accordingly varies the set point pressure of the controller device, such that the screwing displacement of the end cap 38 adjusts a neutral set-point output pressure of the device.

Figure 2:
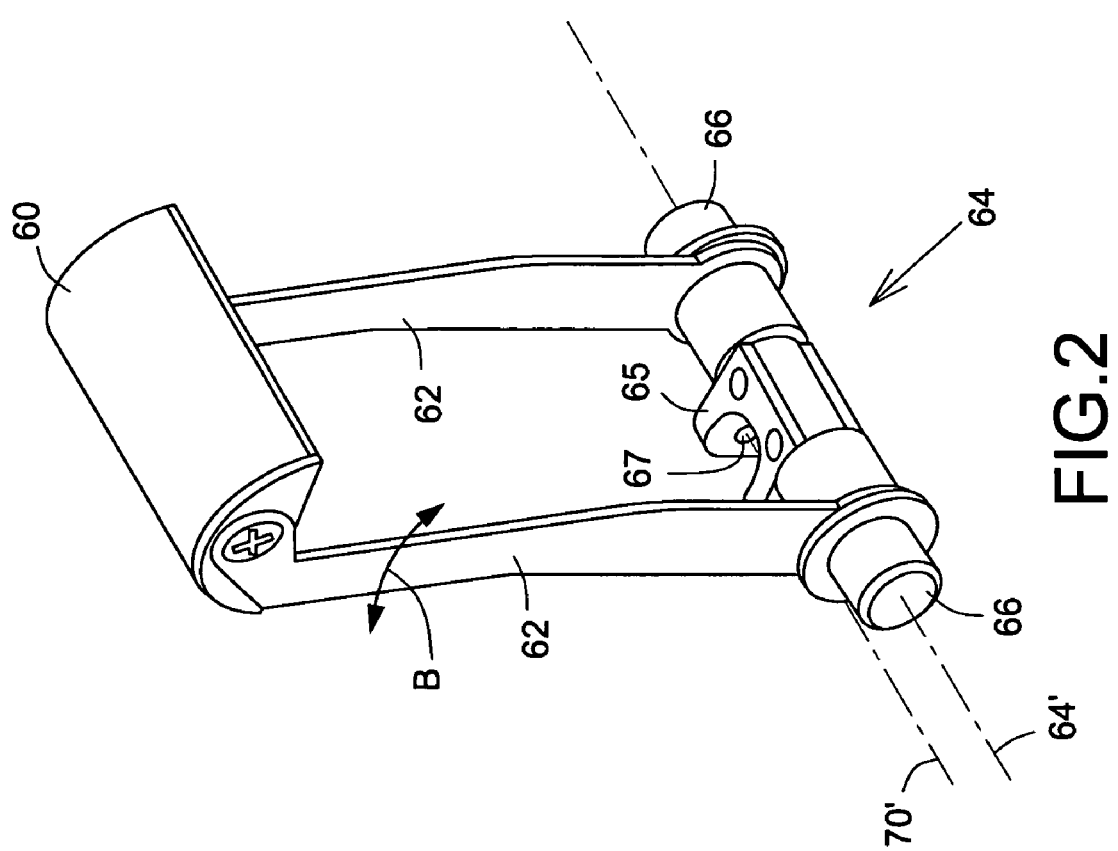
FIG. 2 is a perspective view of a detail shown in FIG. 1 separated from the device per se.
Figure 3:
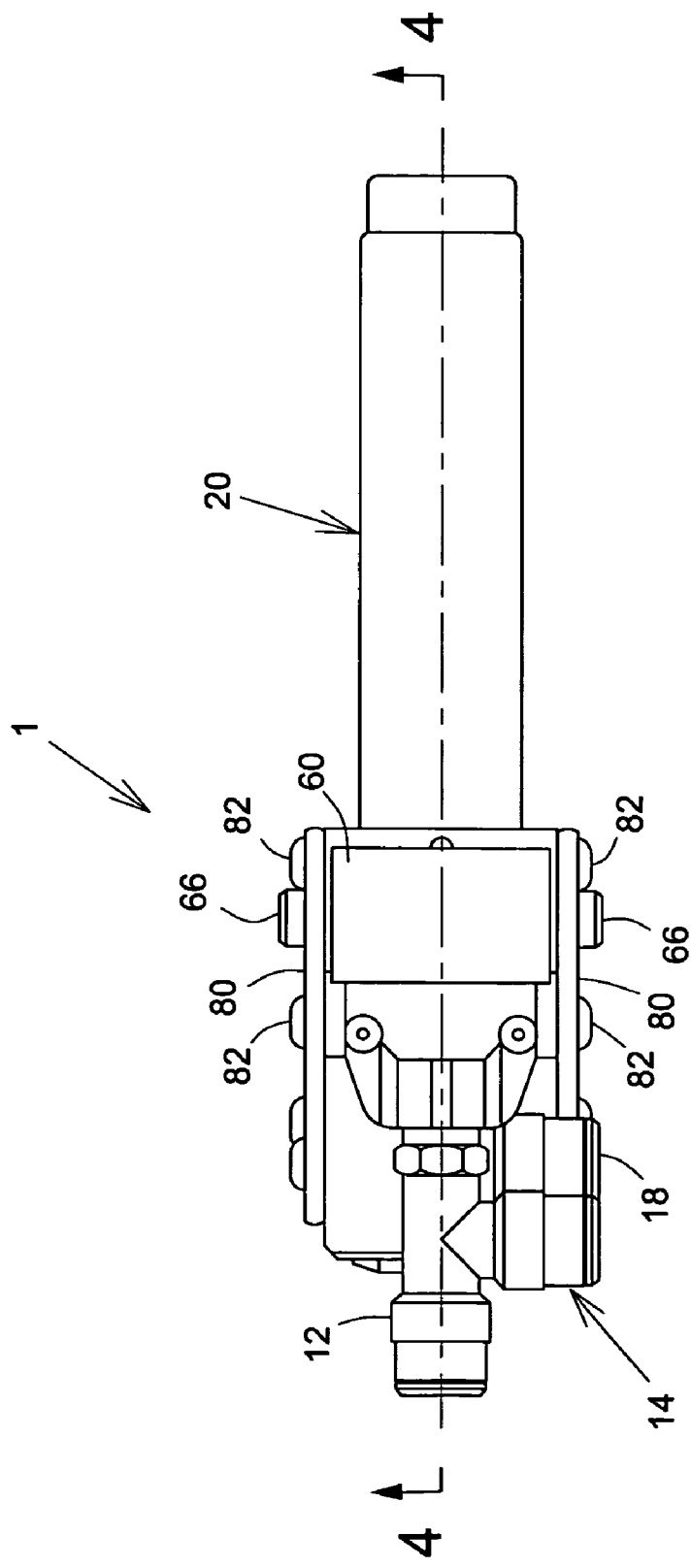
FIG. 3 is a plan view of the device as shown in FIG. 1.
Figure 4:
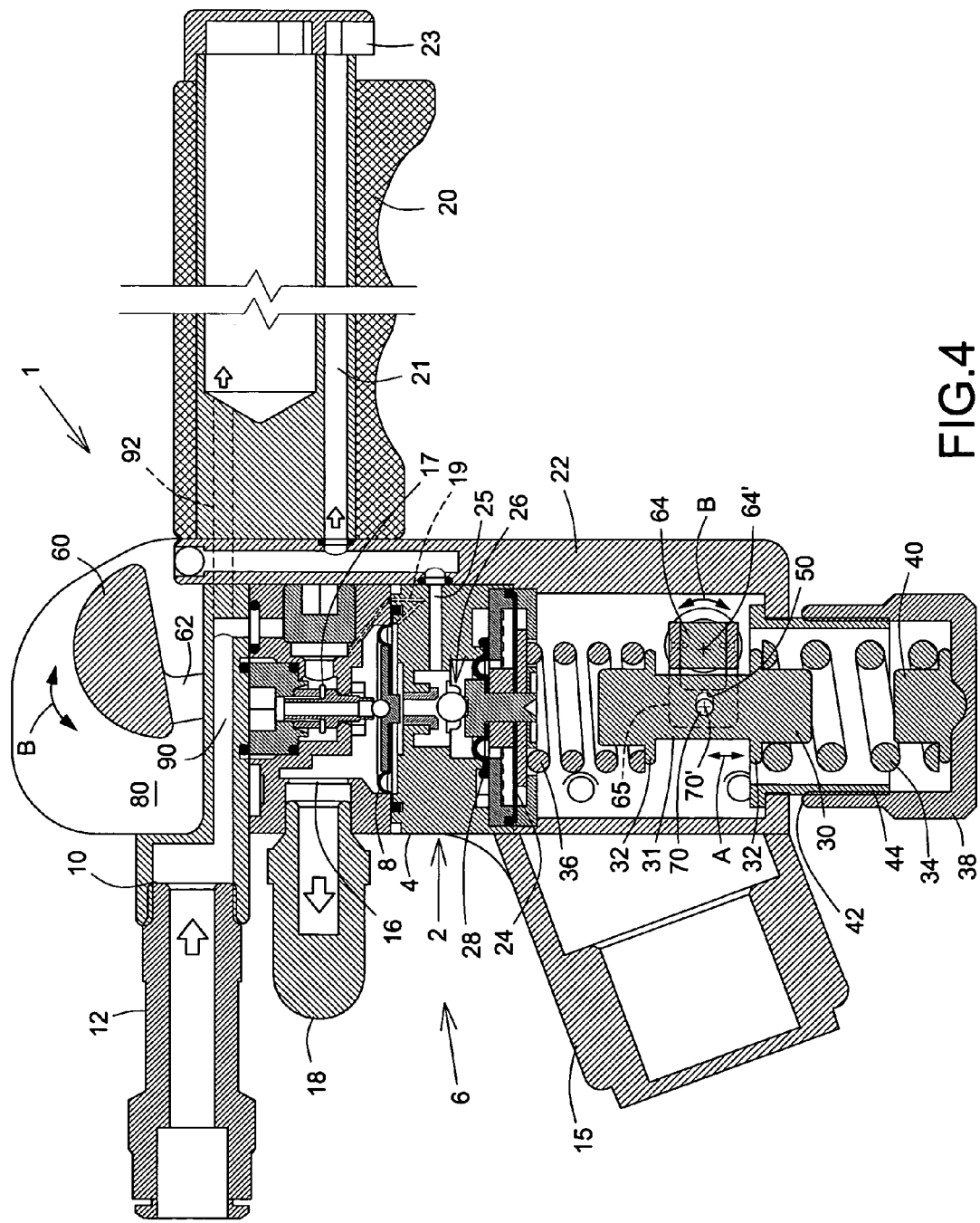
FIG. 4 is a cross sectional side view taken on the line between 4-4 in FIG. 3.

A handle 60 is carried by two lever arms 62, see particularly FIG. 2, which are mounted on a shaft 64 secured to the lever arms and extending through the second part 22 of the housing 2 to be rotatable therein by virtue of the provision of bushings 66 at each end of the shaft 64. The central portion of the shaft 64 is of square section and suitably formed with arms 65 as to be able to embrace the central spindle 31. The arms 65 are apertured at 67 in line to accommodate a dowel pin 70 which extends through the slot 50 as can be more clearly seen in FIG. 4 and abuts one end of the slot 50. The axis 70' of the dowel pin 70 is offset from the axis 64' of the shaft 64 as can be observed. Accordingly rotation of the shaft 64 causes the dowel pin 70 to move in an arc, akin to a rocking movement, and in so doing confers reciprocal movement upon the shuttle 30 as shown by the arrow A in FIG. 4. It will be understood that the rotation of the shaft 64 is initiated by the movement of the handle 60 carried by the lever arms 62. The limit of movement of the lever arms 62 is restricted by the angular formations 72 provided on the exterior of the second part of the housing 2 as shown in FIG. 1a. It will be noted that adjacent the lower ends of the lever arms 62 are recesses 74 formed in the side of the housing and opening into the angular formations 72. In use it is possible that contaminating matter, such as grease and dust, might accumulate in this region and accordingly the provision of the recesses 74 enables access by a cleansing fluid, e.g. compressed air, to remove it.

Side plates 80 are provided for the housing 2 and are bolted thereto as shown at 82. Through holes 84 are bored in the side plates 80 and align with the recesses 74 such that a cleansing fluid may be directed thereinto without the need to remove the side plates 80. The side plates extend upwardly as shown partially to protect the handle 60 from any sideways damage.

In operation, pressure fluid, for example compressed air, is fed to the inlet 10 of the pressure controller device 1 via the feed pipe 12 and passes to the outlet 16 for discharge through the swivel delivery pipe 18. The air flows through passageways 90 formed in the first part of the housing 2 within the precision pressure regulator 6 which maintains a constant output pressure regardless of any fluctuations in the inlet pressure and this adjustment is provided for by the action of the first diaphragm 8 on the valve 17 which serves to provide a pressure balance in conjunction with the position of the second diaphragm 24 and the associated flapper-nozzle arrangement 26.

The second diaphragm 24 and accordingly the flapper-nozzle arrangement 26 are controlled by movement of the shuttle 30 that is effected manually by the handle 60 acting on the lever arms 62 and thus the shaft 64. The handle 60 is profiled in the manner depicted to facilitate use of the thumb to move it in an arc B (FIGS. 2 and 4) with the remaining fingers of the hand encompassing the grip 20. Anti-clockwise rotation causes the shuttle 30 to move downwards as viewed in FIG. 4 under the action of the dowel pin 70 thus releasing (or gradually decreasing the load) the second diaphragm 24 and the flapper-nozzle arrangement 26 to provide a reduction in the outlet pressure by releasing excess pressure that exits through valve 17 to an off-centered internal release passageway 92 extending along the grip 20 to the exhaust 23. Opposite rotation of the handle 60 causes a variation in pressure in the other direction. The range of movement of the handle 60 and thus of the shuttle 30 is determined by the angular set of the formations 72. For example, with a set-point pressure of 50 psi the range of variation is about 20-80 psi provided that the input pressure is at least 80 psi; the set-point pressure may be varied by adjustment of the end cap 38 which in turn varies the spring-rate of the springs acting on the shuttle 30.

The pressure controller device of the present invention has been found to be reliable and easy to operate particularly with the handle 60 shaped as shown. In this connection, operation with a gloved hand has proven to be as effective as it is without a glove. A primary, although not exclusive, application of the invention is in connection with the equipment described in the patent specifications to which reference is made herein in the background section. Accordingly the pressure controller device 1 would be connected to the proportional valve disclosed in U.S. Pat. No. 6,988,513 to Delaney et al. thereby to control the system for lifting and moving an object that forms the subject matter of U.S. Pat. No. 6,845,872 to Delaney. The effective control of that system is of the utmost importance in view of the safety implications. The present invention provides such a control.

Although not specifically illustrated herein, one skilled in the art would recognize that, without departing from the scope of the present invention, the device 1 could have either or both the inlet and the outlet with a plurality of separate feed and delivery pipes connected thereto via a corresponding input and/or output selector for easy and quick selection thereof by the operator such that a same device could be used to control a plurality of remote valves or the like form one or many input pressure lines.

Although the present pressure controller device has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

We claim:

1. A pressure controller device for instantaneous operation with a finger of a user including a housing, a precision pressure regulator located in said housing, an inlet and an outlet for a working fluid in the housing, a valve located intermediate said inlet and outlet, a first diaphragm operable upon said valve and actuable by the working fluid, a pressure adjustment mechanism located in the housing and including a second diaphragm and a flapper-nozzle arrangement actuable by said second diaphragm, said device comprising a shuttle resiliently loaded at each end thereof and actuable to operate said second diaphragm, a handle located externally of the housing and carried on at least one lever arm external to the housing, the arm supporting at a distal end remote therefrom a shaft rotatably mounted on the housing and providing a pivot axis for the handle, a central portion of the shaft connecting to the shuttle intermediate both ends thereof the handle being operable between predetermined limits to shift said shuttle and to move the second diaphragm and thus the flapper-nozzle arrangement thereby through the agency of the first diaphragm to adjust the pressure of the working fluid flowing through the valve between the inlet and the outlet, the operation of the handle in use overriding the precision pressure regulator to vary the pressure of the working fluid passing through the outlet.

2. A pressure controller device according to claim 1 wherein the resilient loading of the shuttle is provided by open coil compression springs operating on each said end of the shuttle.

3. A pressure controller device according to claim 2 wherein the housing has an extension within which one of the springs is accommodated, a cap is provided for the extension and contains the spring in position, the cap being adapted for adjustment in relation to the extension thereby in use to adjust the spring rate.

4. A pressure controller device according to claim 1 wherein the handle is carried on two lever arms external to the housing, each said arm supporting at a distal end remote therefrom the shaft extending through the housing.

5. A pressure controller device according to claim 4 wherein the central portion of the shaft is suitably formed to embrace the shuffle and is provided with a pin, a slot is formed in the shuttle and the pin registers therewith, whereby in use rotation of the shaft and movement of the pin confers rectilinear movement of the shuffle against the action of the resilient loading thereof.

6. A pressure controller device according to claim 2 wherein one said open coil compression spring operating upon the shuttle is mechanically linked to the second diaphragm, whereby in use upon shifting of the shuttle said valve moves to control the pressure of fluid in the outlet of the device by interacting with the first diaphragm.

7. A pressure controller device according to claim 4 wherein the shaft is provided with bushings which are supported in the housing and extend therethrough.

8. A pressure controller device according to claim 7 wherein side plates are provided for the housing and the bushings extend into the side plates.

9. A pressure controller device according to claim 8 wherein the housing is provided with angled formations adjacent the relatively lower end of the lever arms and the bushings, the formations being adapted to provide movement limiters for the lever arms.

10. A pressure controller device according to claim 9 wherein recess means are provided adjacent the formations and are adapted to provide clearance regions for access by a cleaning medium, the side plates having aperture means for such access aligning with the recess means.

11. A pressure controller device according to claim 1 wherein the handle is contoured for ease of operation.

12. A pressure controller device according to claim 1 wherein a grip is provided on the outside of the housing in close adjacency to the handle.

13. A pressure controller device according to claim 12 wherein the grip is provided with an internal passageway for the flow of leakage fluid from the housing.

14. A pressure controller device for instantaneous operation with a finger of a user including a housing, a precision pressure regulator located in said housing, an inlet and an outlet for a working fluid in the housing, a valve located intermediate said inlet and outlet, a first diaphragm operable upon said valve and actuable by the working fluid, a pressure adjustment mechanism located in the housing and including a second diaphragm, a flapper-nozzle arrangement actuable by said second diaphragm, and a neutral set-point output pressure mechanism for adjustment of said neutral output pressure of said precision pressure regulator, said device comprising a shuttle resiliently loaded at each end thereof via a respective resilient member and actuable to operate said second diaphragm via the resilient member, said shuffle being located intermediate said second diaphragm and said neutral set-point output pressure mechanism, a handle located externally of the housing and operable between predetermined limits to shift said shuffle and to move the second diaphragm and thus the flapper-nozzle arrangement thereby through the agency of the first diaphragm to adjust the pressure of the working fluid flowing through the valve between the inlet and the outlet, the operation of the handle in use temporarily overriding the neutral set-point output pressure mechanism of the precision pressure regulator to temporarily vary the pressure of the working fluid passing through the outlet of the neutral output pressure, the resilient loading of the shuttle being provided by open coil compression springs operating on each said end of the shuttle, the handle being carried on at least one lever arm external to the housing, the arm supporting at a distal end remote therefrom the shaft extending through the housing and rotatably mounted therein, the shaft providing a ivot axis for the handle, a central portion of the shaft connecting to the shuttle intermediate both ends thereof.

* * * * *